United States Patent
Isono

Patent Number: 5,959,661
Date of Patent: *Sep. 28, 1999

[54] TV TELEPHONE TERMINAL

[75] Inventor: Osamu Isono, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/701,547

[22] Filed: Aug. 22, 1996

Related U.S. Application Data

[63] Continuation of application No. 08/298,463, Aug. 30, 1994, abandoned.

[30] Foreign Application Priority Data

Mar. 4, 1994 [JP] Japan ............................ 6-034908

[51] Int. Cl.⁶ .................................................. H04N 7/14
[52] U.S. Cl. .................... 348/14; 379/93.22; 379/102.02
[58] Field of Search ................................. 348/14, 15, 16, 348/17, 18, 19, 159, 39; 379/93.17, 102.01, 102.02, 102.07, 93.22, 93.21; H04N 7/14

[56] References Cited

U.S. PATENT DOCUMENTS

| | | | |
|---|---|---|---|
| 4,258,387 | 3/1981 | Lemelson et al. | 348/14 |
| 4,980,761 | 12/1990 | Natori | 348/15 |
| 5,042,006 | 8/1991 | Flohrer | 348/14 |
| 5,170,427 | 12/1992 | Guichard et al. | 348/14 |
| 5,202,759 | 4/1993 | Laycock | 348/14 |

FOREIGN PATENT DOCUMENTS

| | | | |
|---|---|---|---|
| 0114485 | 5/1988 | Japan | H04N 7/14 |
| 0133490 | 5/1989 | Japan | H04N 7/14 |
| 0258576 | 10/1989 | Japan | H04N 7/14 |
| 0095089 | 4/1990 | Japan | H04N 7/14 |

OTHER PUBLICATIONS

English translation of Japanese reference JA–0095089 (Fukuzaki), previously cited with Paper #3, Apr. 1990.

*Primary Examiner*—Stella Woo
*Attorney, Agent, or Firm*—Helfgott & Karas, PC.

[57] ABSTRACT

A telephone terminal capable of sending and receiving images and sounds, having a movable camera for obtaining images of the surrounding area and a sound-collection microphone for collecting surround sounds, automatic answering circuitry which automatically responds to a call received from a calling terminal and which starts the transmission of surrounding area images and sounds, and a transmission switching circuit which, upon response by the automatic answering circuitry, switches connection from the fixed microphone and handset for TV telephone use to the movable camera and sound-collection microphone.

17 Claims, 10 Drawing Sheets

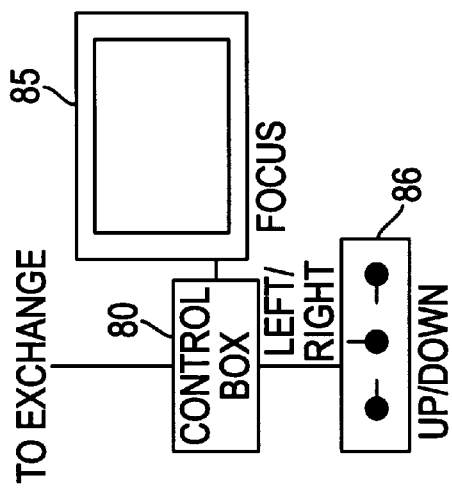
FIG. 7C
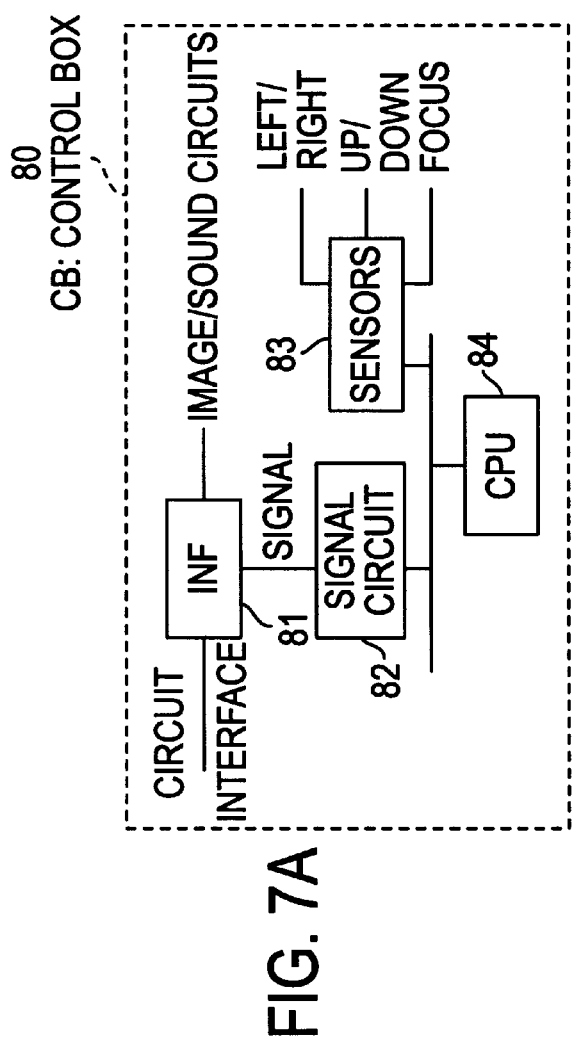
FIG. 7A
FIG. 7B

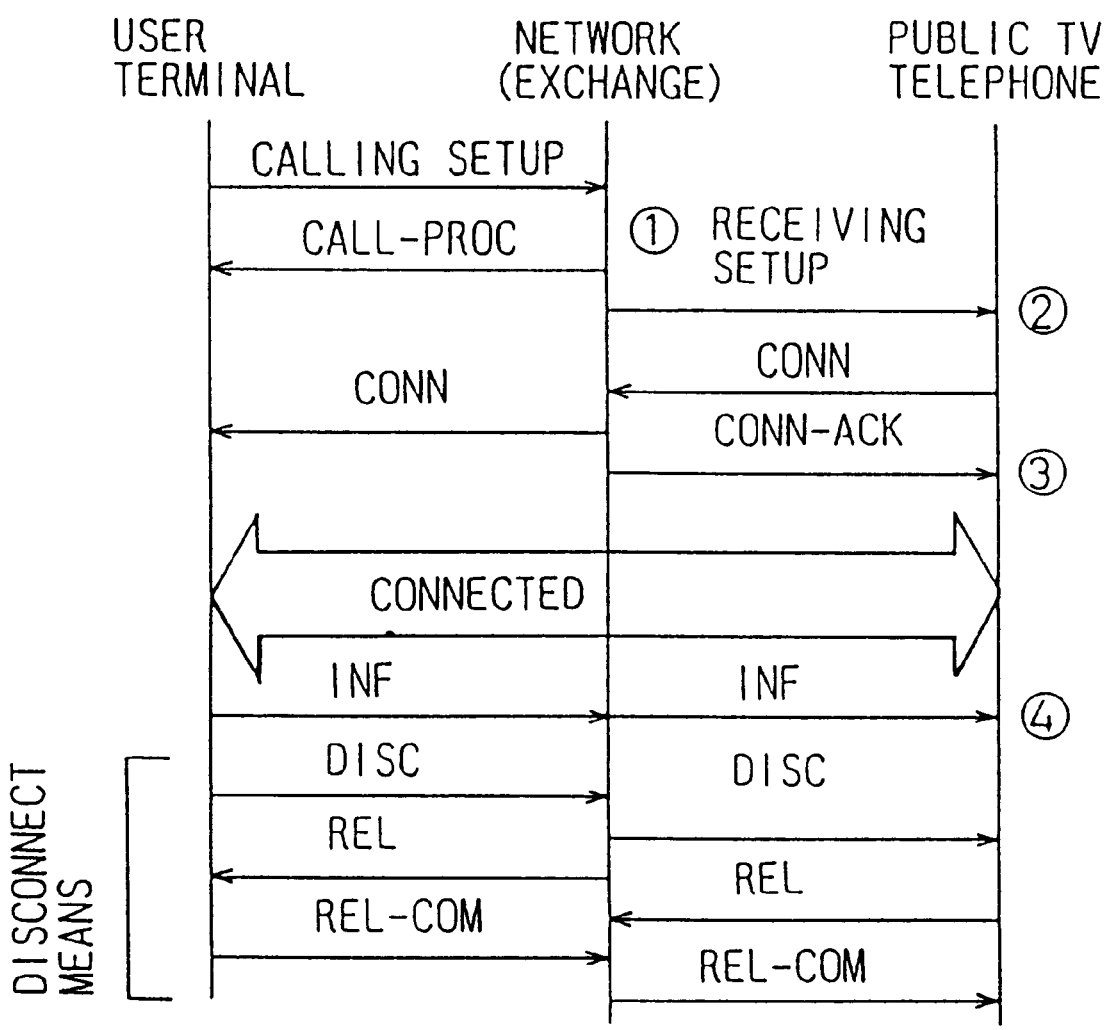

TV TELEPHONE TERMINAL

This is a continuation of application Ser. No. 08/298,463, filed Aug. 30, 1994, now abandoned.

BACKGROUND OF THE INVENTION

1. Field of the Invention

The present invention is related to a public TV (television) telephone terminal, and more specifically it is related to a TV telephone terminal installed in a telephone booth and which receives calls from TV telephones of general subscribers, a movable camera installed in the telephone booth being remotely controlled from the TV telephone of the general subscriber to obtain the desired images from the surrounding area.

2. Description of the Related Art

The increasing complexity of our society and increasing level of the work performed creates stress in our daily lives, which can accumulate. This is now being treated as a social problem, with one method of relieving such stress being, for example, the viewing of commercially produced video tapes, which are effective in relaxing the heart, the spirit, and the nerves.

However, in using such video tapes, the image content is limited to that on the tape at the time of purchase, and one tires of it as the tape is viewed repeatedly.

In the field of electronic communications the widespread adoption of broadband ISDN (ATM communications) has created the expectation of a shift from the voice-based telephone of today to imaged-based TV telephones. In making this shift, it is expected that the TV telephone will be used to access video databases, making it easy to acquire images and sounds of the environment and of scenery, in what could be called an "environment data providing service."

However, even using this method, because the images and other information obtained from the above-noted image database are data which have been stored beforehand, and therefore is not live information, there is the problem of tiring of the information, for the reason mentioned above. In addition, in this case, a costly center facility would be required, leaving unsolved the technical problem of providing environmental images and natural sounds easily and at a low cost.

SUMMARY OF THE INVENTION

An object of the present invention, in consideration of the above-noted problems, is to provide a TV telephone terminal, the future adoption of which is inevitable (including elements such as a camera, monitor, microphone, and handset) whereby the camera, microphone and other elements of this TV telephone terminal are used to enable a general user of a TV telephone to, for example, from the home, call such public TV telephone terminals installed in such locations as tourist spots, the mountains, and the seashore, the terminal then providing the user with live images and natural sounds. In addition, the object of the present invention in doing this is to provide a TV telephone terminal, the camera angle, focus and other settings of which can be freely controlled by a given control procedure.

The present invention, which is a telephone terminal capable of sending and receiving image and sound information, having a movable camera for obtaining images of the surrounding area, a sound-collection microphone for collecting surrounding sounds, an automatic answering means in response to a call received from a calling terminal, for transmitting the above-noted images and sounds, and a transmission switching means for switching the connection from the TV telephone fixed camera and handset to the above-noted movable camera and sound-collection microphone when response is made to a received call by the above-noted means for automatic answer.

According to the present invention, the above-noted TV telephone terminal also has a movable camera remote control means which controls the angle and focus of the movable camera in accordance with the required control signals sent from the above-noted TV telephone terminal, as well as a display means which indicates that the above-noted automatic answering means is in operation.

BRIEF DESCRIPTION OF THE DRAWINGS

The present invention will be more clearly understood from the description as set forth below, with reference to the accompanying drawings.

FIG. 7(A) is an explanatory drawing which illustrates an example of the method of control, at the transmitter's side, of the movable camera of the public TV telephone terminal.

FIG. 7(B) is a diagram showing an example of an INF message format.

FIG. 7(C) illustrates a terminal including the controller of FIG. 7(A).

FIG. 9 is a sequence diagram which shows an example of the basic switching sequence occurring when accessing the public TV telephone terminal according to the present invention.

DESCRIPTION OF THE PREFERRED EMBODIMENTS

Figure 1:
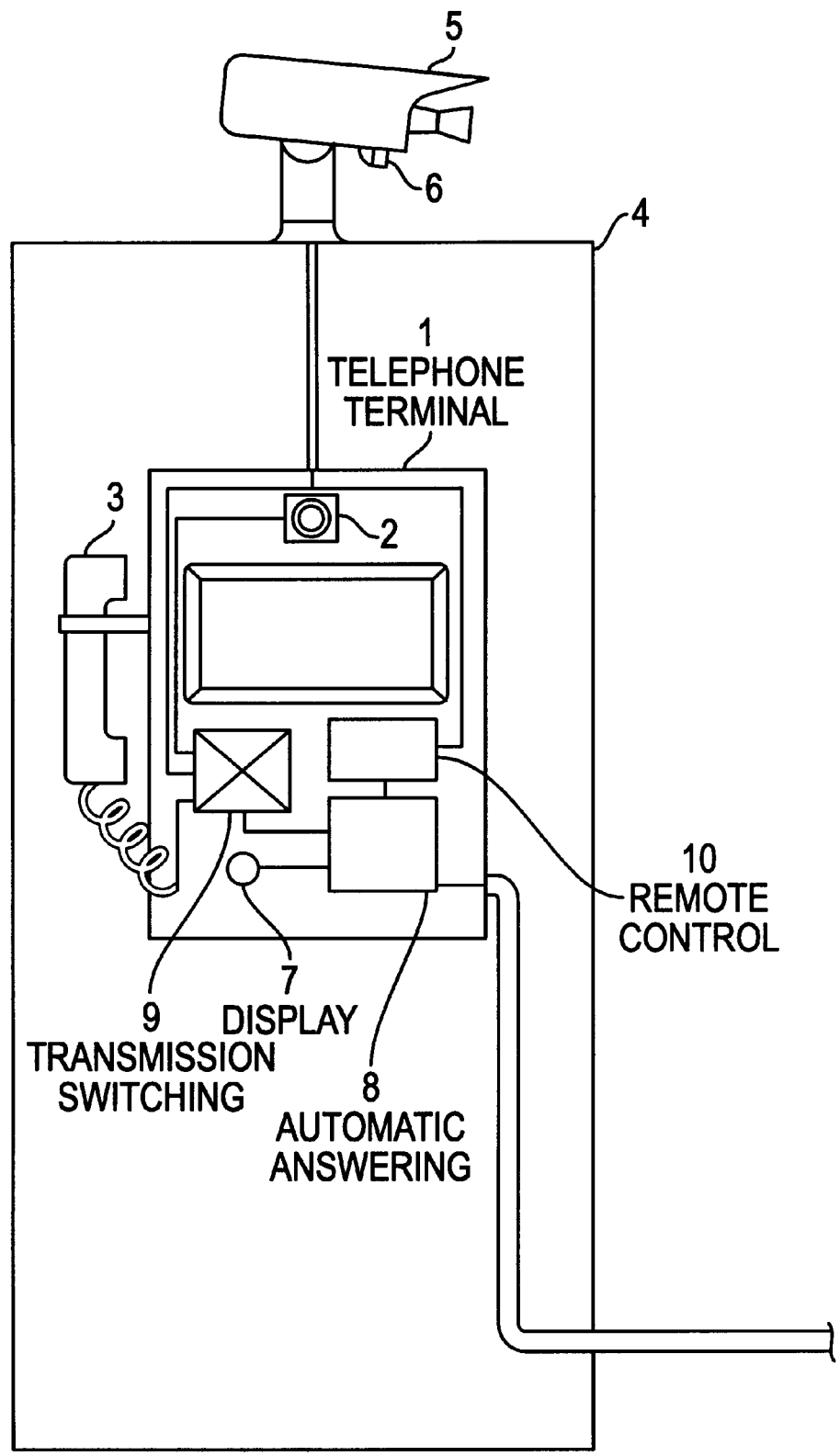
FIG. 1 is an explanatory drawing which illustrates the basic configuration of an embodiment of a public TV telephone terminal according to the present invention.

FIG. 1 illustrates the basic configuration of a TV telephone terminal according to the present invention.

As shown in FIG. 1, in accordance with the present invention, a TV telephone terminal 1 capable of sending and receiving image and sound information has, a movable camera 5 for the purpose of obtaining pictures of the surrounding area, a sound-collection microphone 6 to collect surrounding sound, an automatic answering means for making an automatic response to a call from a sending terminal and for starting the transmission of the above-noted surrounding images and sounds, and a transmission switching means which, in the response by the above-noted automatic answering means to a received call, switches from the fixed camera 2 and handset 3 for the TV telephone to the above-noted movable camera 5 and sound-collection microphone 6.

According to the present invention, the above-noted TV telephone terminal also has a movable camera remote control means 10, which controls the angle and the focus of the movable camera 5 in accordance with control signals sent from the transmitting terminal, and a display means 7 which indicates that the above-noted automatic answering means is in operation. This display means 7 can be, for example, in the form of an "in-use" lamp, and the movable camera 5 and sound-collection microphone 6 are installed on the top of the telephone booth 4 in which the TV telephone terminal is installed.

The TV telephone terminal in accordance with the present invention has, in addition to the conventional TV telephone functions of a handset and a TV monitor, an automatic answering means 8 which responds automatically to incoming calls, and additionally has a newly provided movable camera 5, sound-collection microphone 6, and display means 7 (in-use lamp) which indicates that the automatic answering means is in operation.

When a signal is received from a sending terminal, the above-noted automatic answering means 8 instructs the above-noted transmission switching means 9 to switch the image and sound transmission path from the TV telephone handset 3 and fixed camera 2 to the above-noted movable camera 5 and sound-collection microphone 6, and sends the images and sound from the movable camera 5 and sound-collection microphone 6 to the transmitting terminal. To indicate to the general user during a receipt of call such as described above that this TV telephone cannot be used, the automatic answering means 8 instructs the display means 7 to, for example, light an in-use lamp.

Figure 2:
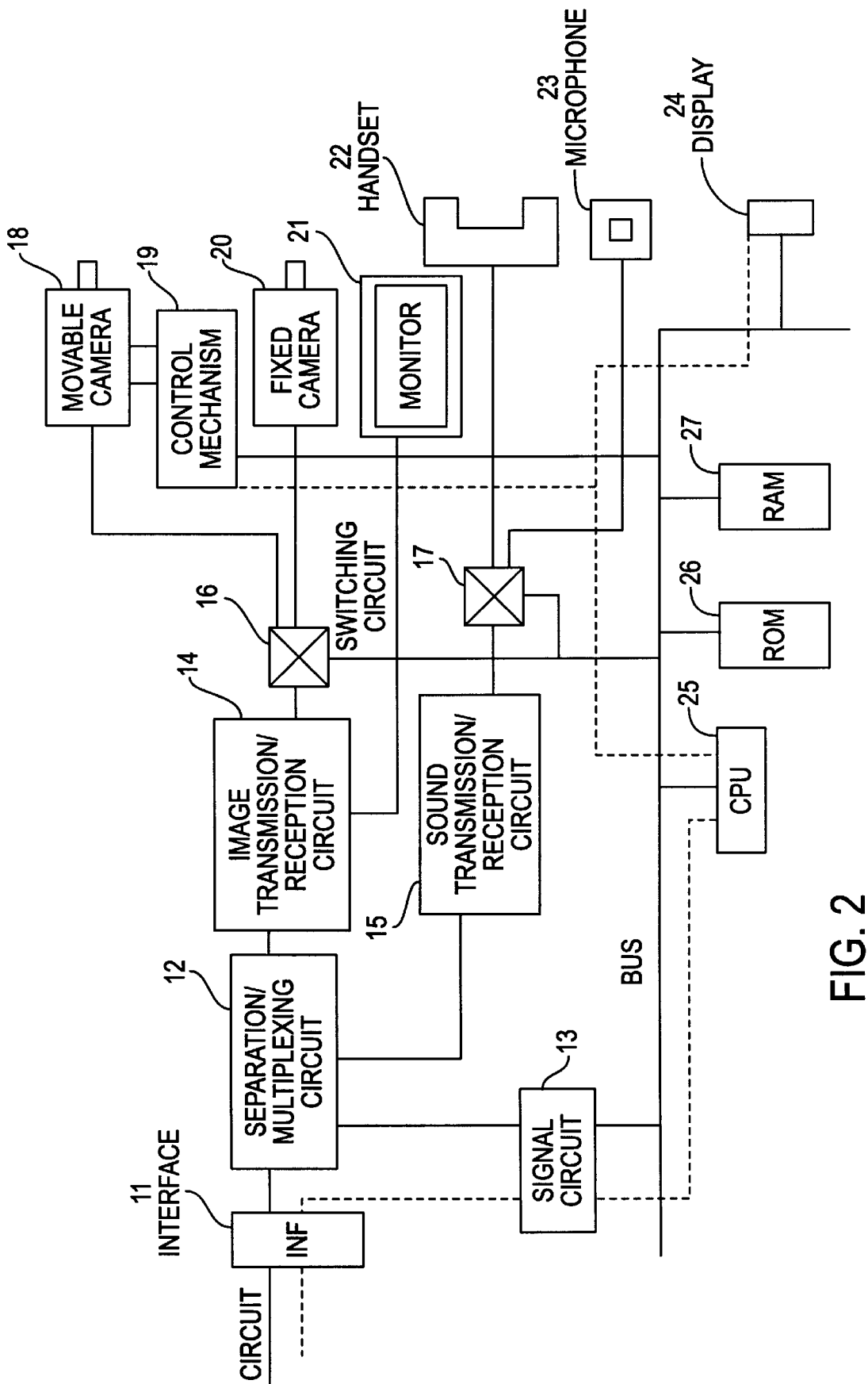
FIG. 2 is a circuit block diagram which shows an embodiment of a public TV telephone terminal according to the present invention.

The above-noted movable camera 5 and sound-collection microphone 6 are installed on the top of the telephone booth 4 and are used to collect images and sounds from, for example, the surrounding area, including the scenery, natural sounds, or surrounding traffic conditions. The angle and focus of the movable camera 5 can be remotely controlled from the transmitting terminal, in accordance with a communications protocol, this enabling the free selection of the desired images from the calling side FIG. 2 is a circuit block diagram which shows an embodiment of a public TV telephone terminal according to the present invention. And FIG. 3 through FIG. 6 are circuit block diagrams which each show examples of circuit configurations of a respective block in FIG. 2.

The relationship between FIG. 2 and the basic configuration of the present invention as discussed above in terms of FIG. 1 is that the movable camera 18, microphone 23, and in-use display lamp 24 of FIG. 2 correspond to the movable camera 5, sound-collection microphone 6, and display means 7 of FIG. 1. The fixed camera 20, handset 22, and switching circuits 16 and 17 of FIG. 2 corresponding respectively to the fixed camera 2, handset 3, and transmission switching means 9 of FIG. 1. In addition, the telephone control circuit made up of CPU 25, ROM 26, and RAM 27 and the movable camera control mechanism 19 correspond to the automatic answering means 8 and movable camera control means 10 of FIG. 1.

In FIG. 2, interface circuit (INF) 11 is connected in this example to an optical fiber cable of an ATM exchange for B-ISDN, with opto-electrical (O/E) and electro-optical (E/O) conversions being performed of the optical signals on this cable and the electrical signals within the terminal. The separation/multiplexing circuit 12 separates the ATM cells from the above-noted ATM exchange into image cells, voice cells, and signal cells, and in transmission sequentially inserts image cells, voice cells, and signal cells into empty transmission cells. The signal circuit 13 executes layer 2 and layer 3 control of signal cells between the separation/multiplexing circuit 12 and the telephone control circuit.

The image transmission/reception circuit 14 performs transmission and reception of image cells with the above-noted separation/multiplexing circuit 12, with the picture information obtained from either the fixed camera 20 or the movable camera 18, as selected by the image signal switching circuit 16, being assembled into image cells and transmitted, and with received image cells being separated and displayed on the monitor 21 of the TV telephone. In making automatic response, the switching circuit 16 of the present invention selects the movable camera 18 by means of the above-noted telephone control circuit.

The sound transmission/reception circuit 15 performs transmission and reception of voice cells with the separation/multiplexing circuit 12, with the sound information obtained from either the TV telephone handset 22 or the microphone 23, as selected by the voice signal switching circuit 17, being assembled into voice cells and transmitted, and with received voice cells being separated and output to the handset 22. In making automatic response, the switching circuit 17 of the present invention selects the microphone 23 by means of the above-noted telephone control circuit.

The above-noted telephone control circuit lights the in-use display lamp when the automatic response is made, and stops the public telephone function when this service is in operation. In addition, the telephone control circuit receives INF messages from the calling end in accordance with the prescribed movable camera control protocol, and performs control of the control mechanism 19 of the movable camera. By doing this, it is possible from the calling end to remotely control the camera angle and focus, enabling the achievement of the desired real-time image.

Figure 3:
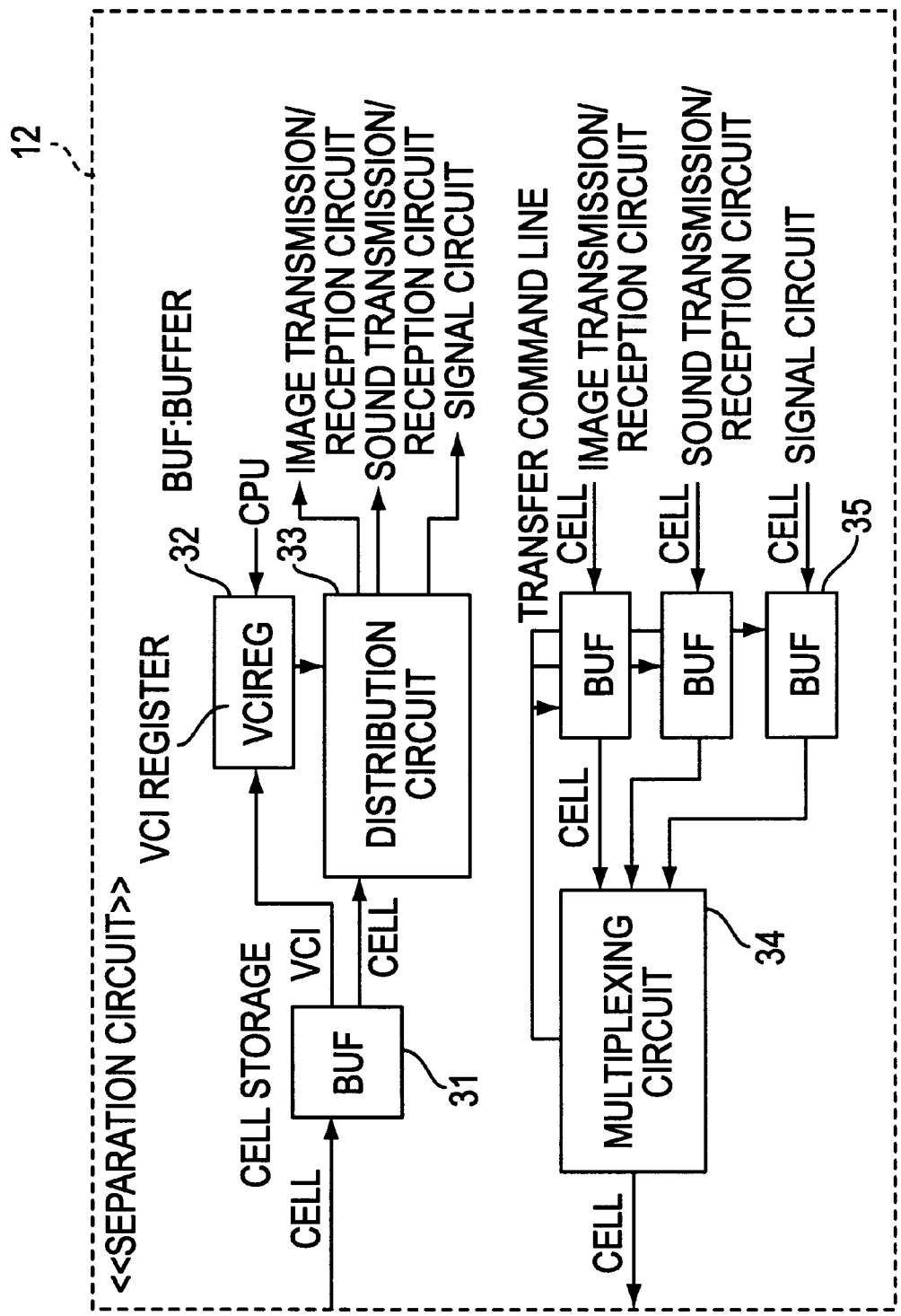
FIG. 3 is a circuit block diagram which shows an example of a configuration of the separation/multiplexing circuit of FIG. 2.

FIG. 3 is a circuit block diagram which shows an example of the configuration of the separation/multiplexing circuit 12 shown in FIG. 2.

In FIG. 3, ATM cells received at interface 11 (refer to FIG. 2) are temporarily stored in cell storage buffer circuit (BUF) 31. During this time, the VCI cell header part for the above-noted ATM cell is input by the CPU to the VCI register 32, the distribution circuit 33 separating this cell, by means of a comparison with the contents of the VCI register, into voice and signal cells, sending these to the corresponding image transmission/reception circuit 14, sound transmission/reception circuit 15, and the signal circuit 13. On the other hand, each of the cells input from the image transmission/reception circuit 14, sound transmission/reception circuit 15, and signal circuit 13 are temporarily stored into the buffer circuit 35, after which these are sequentially inserted into empty transmission cells in accordance with transfer instructions from the multiplexing circuit 34, which is the next stage.

Figure 4:
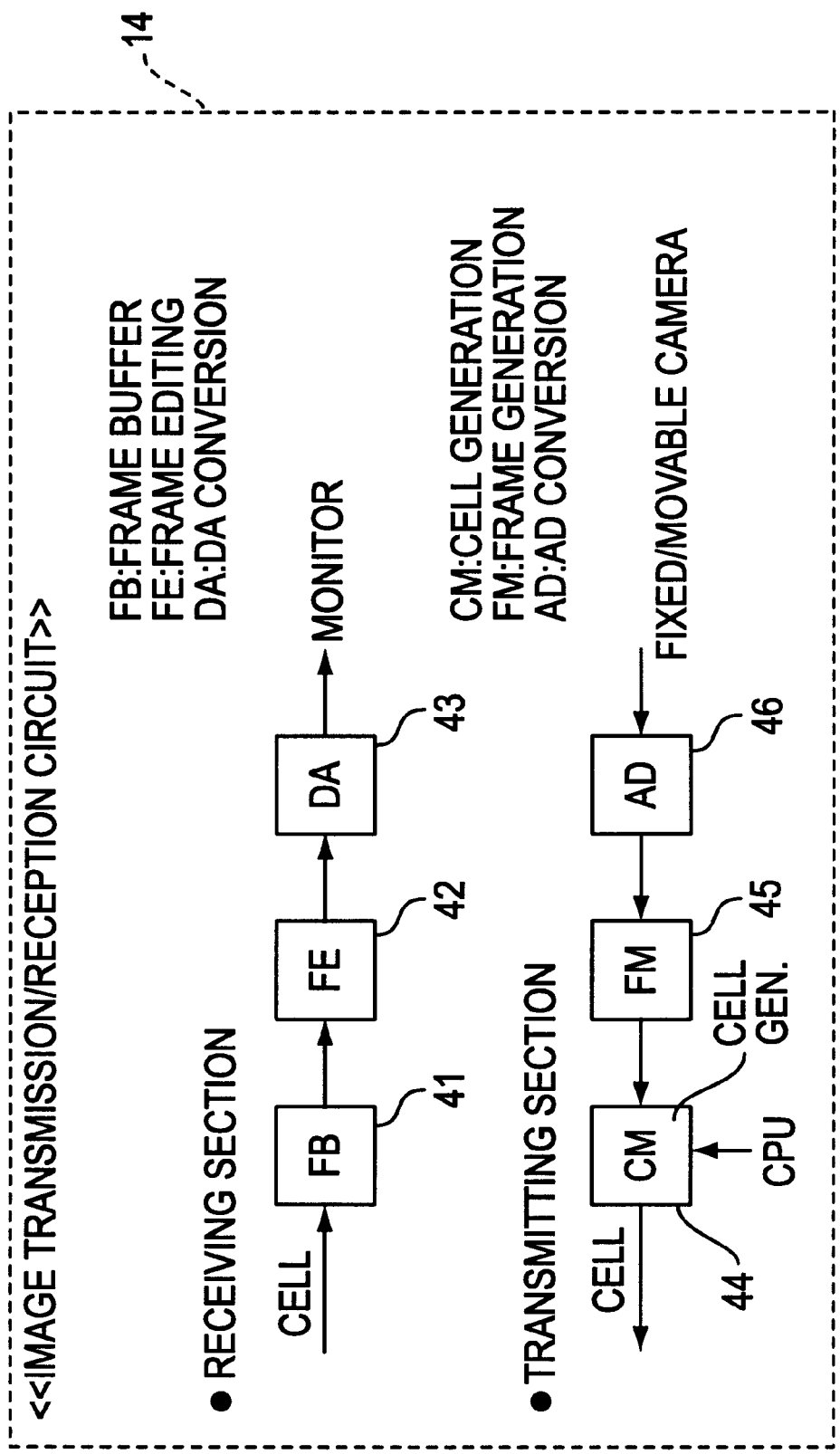
FIG. 4 is a circuit block diagram which shows an example of a configuration of the image transmission/reception circuit of FIG. 2.

FIG. 4 is a circuit block diagram which shows an example of a circuit configuration of the image transmission/reception circuit 14 shown in FIG. 2.

In FIG. 4, the receiving part of image transmission/reception circuit 14 stores each of the image cells from the separation/multiplexing circuit 12 of FIG. 2 in units of frames (1/30 second) into the frame buffer circuit (FB) 41. The subsequent frame editing circuit (FE) 42 and DA converter (DA) 43 edit and convert these in units of frames into an analog video signal for the monitor, and display these on the monitor 21 of FIG. 2. At the transmission section, the image signal from either the fixed camera 20 or movable camera 18, as selected by the switching circuit 16 of FIG. 2, is converted to a digital signal by the AD converter circuit (AD) 46, this being assembled into frames at the next stage, which is the frame generation circuit 45. The last stage, which is the cell generation circuit (CM) 44 cellularizes this, setting the VCI which indicates the cell type into the cell header, and then transmitting this.

Figure 5:
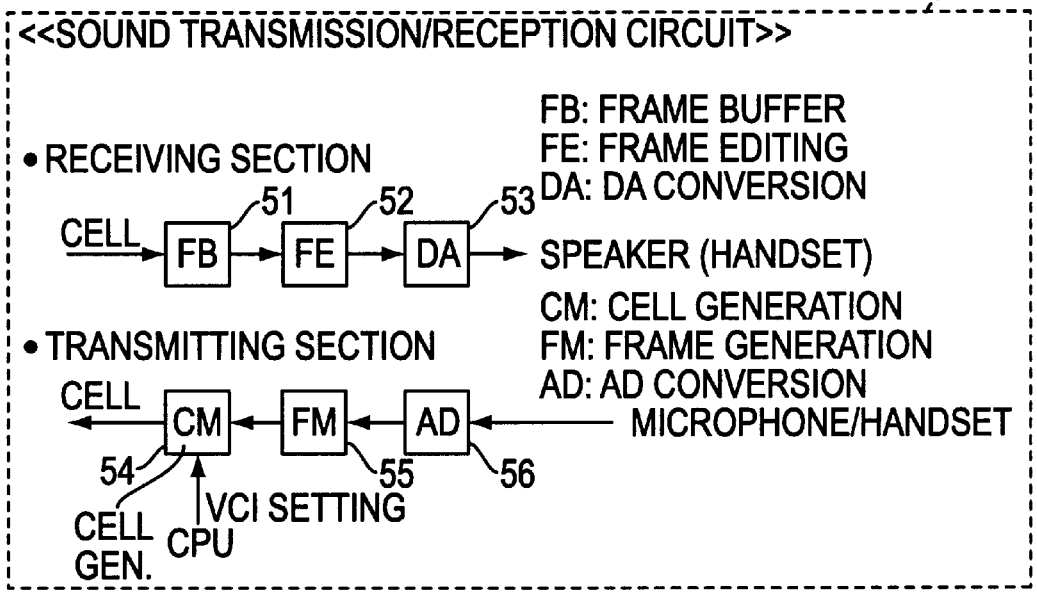
FIG. 5 is a circuit block diagram which shows an example of the configuration of the sound transmission/reception circuit of FIG. 2.

FIG. 5 is a circuit block diagram which shows an example of the circuit configuration of the sound transmission/reception circuit 15 shown in FIG. 2.

In FIG. 5, because the circuit configuration of the sound transmission/reception circuit 15 is the same as the previously described image transmission/reception circuit 14, it will not be described herein. However, the signals it deals with are voice signals, and a sampling period of, for example, 8 kHz (125 μsec) is used as the frame unit.

Figure 6:
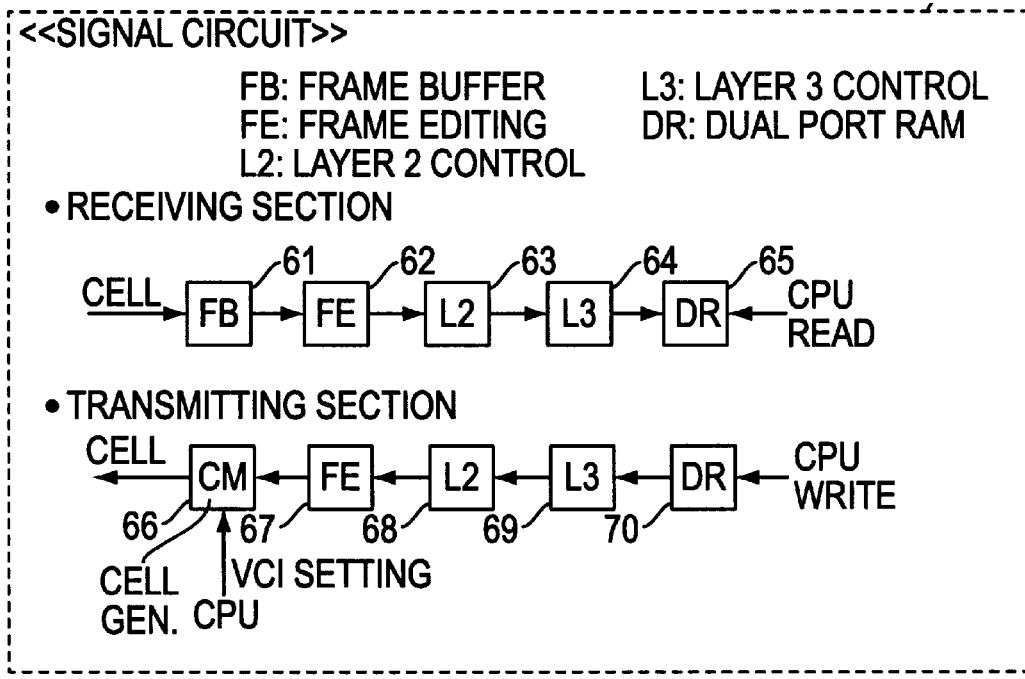
FIG. 6 is a circuit block diagram showing an example of the configuration of the signal circuit of FIG. 2.

FIG. 6 is a circuit block diagram which shows an example of the circuit configuration of the signal circuit 13 shown in FIG. 2.

While FIG. 6 has nearly the same configuration as described above, in the receiving section of FIG. 6 the frame buffer circuit (FB) 61 performs storage of each of the signal cells from the separation/multiplexing circuit 12 of FIG. 2 in units of LAP-D frames (HDLC frame units). Then, in the subsequent layer 2 control circuit 63 and layer 3 control circuit 64, processing of the above LAP-D layer 2 and layer 3 is executed, with the results of this being passed to the internal CPU via the next stage, which is dual port RAM (DR) 65. At the transmission section, the reverse of the above processing is performed to output signal cells.

FIGS. 7(A)–(C) are is an explanatory drawings which illustrate an example of a method of controlling the movable camera of the public TV telephone terminal by the caller (side receiving this service).

FIG. 8 is an explanatory drawing which illustrates an example of a method of controlling the movable camera from the public TV telephone terminal (the side from which the service is provided).

First, in FIG. 7(A), for example, the person who wishes to receive this service, dials the public TV telephone terminal of the present invention from his or her subscriber TV telephone. The public TV telephone terminal automatically responds to the call, sending images of the surrounding area from the moving camera to the caller, this initial image being displayed on the home TV telephone monitor 85.

Thereafter, the caller can use the control box (CB) 80 and control pad 86 connected to the TV telephone to control the image on the monitor 85. For example, if the caller moves the up and down, left and right, and focus levers of the control pad 86, a sensor 83 within the control pad detects this movement. This is read by the control CPU 84 of the control box, INF messages as shown in FIG. 7(B) being generated, these being sent to the public TV telephone terminal via the signal circuit 82 and interface of the type shown in FIG. 2.

Figure 8A:
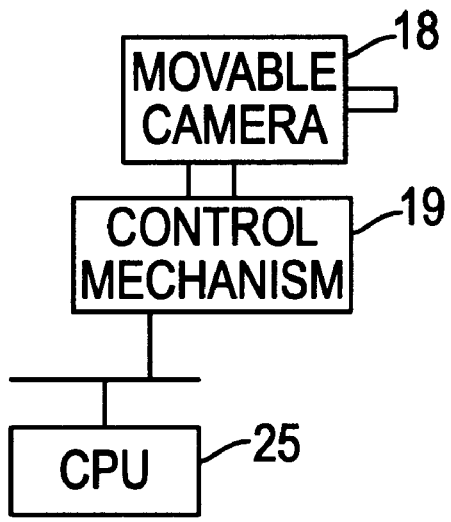
FIG. 8(A) is an explanatory drawing which illustrates an example the method of control of the movable camera at the public TV telephone terminal side.
Figure 8B:
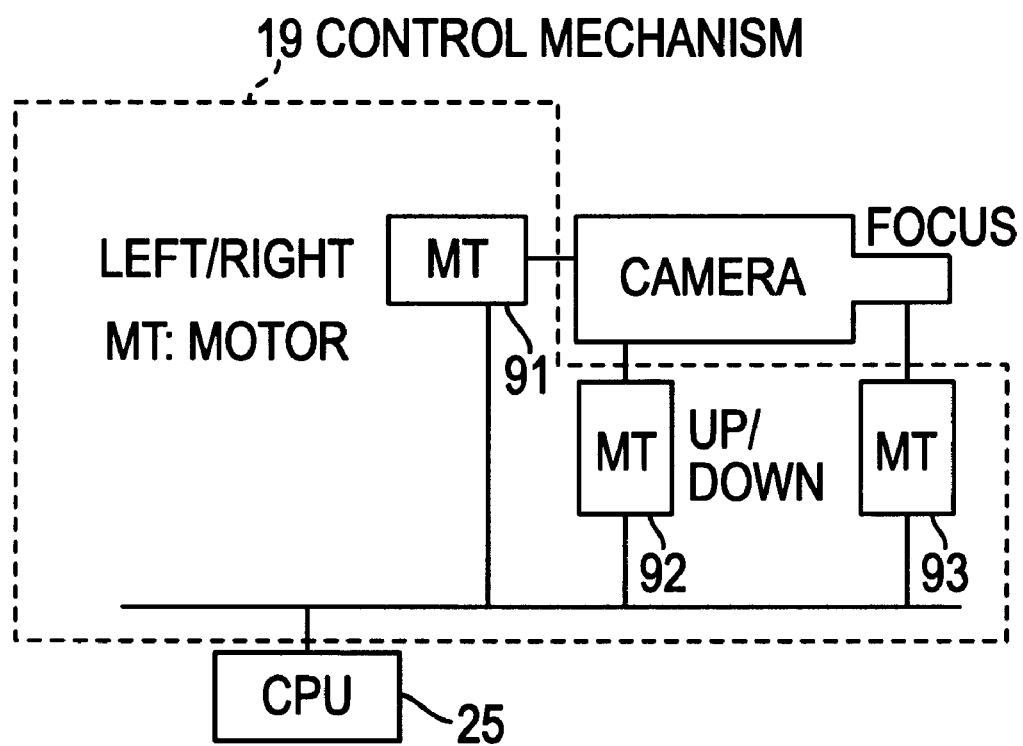
FIG. 8(B) illustrates in greater detail the control mechanism of FIG. 8(A).

In FIG. 8(A), when the public TV telephone terminal receives the above-noted interface messages (FIG. 7(B)) CPU 25 of the telephone control circuit interprets these messages and issues movement commands for the movable camera to the control mechanism 19 shown in FIG. 2. For example, operation of the left/right, up/down and focus shown within the dotted lines of FIG. 8(B) causes the issuance of corresponding control signals for setting the required positions to the motors (MT) 91 to 93 which control each of these movements. In this case it is desirable to have a transparent transfer function in the exchange or network which notifies the public TV telephone terminal of the INF messages from the user terminal.

FIG. 9 is a sequence diagram which shows an example of the basic switching sequence when accessing the public TV telephone terminal of the present invention.

Figure 10:
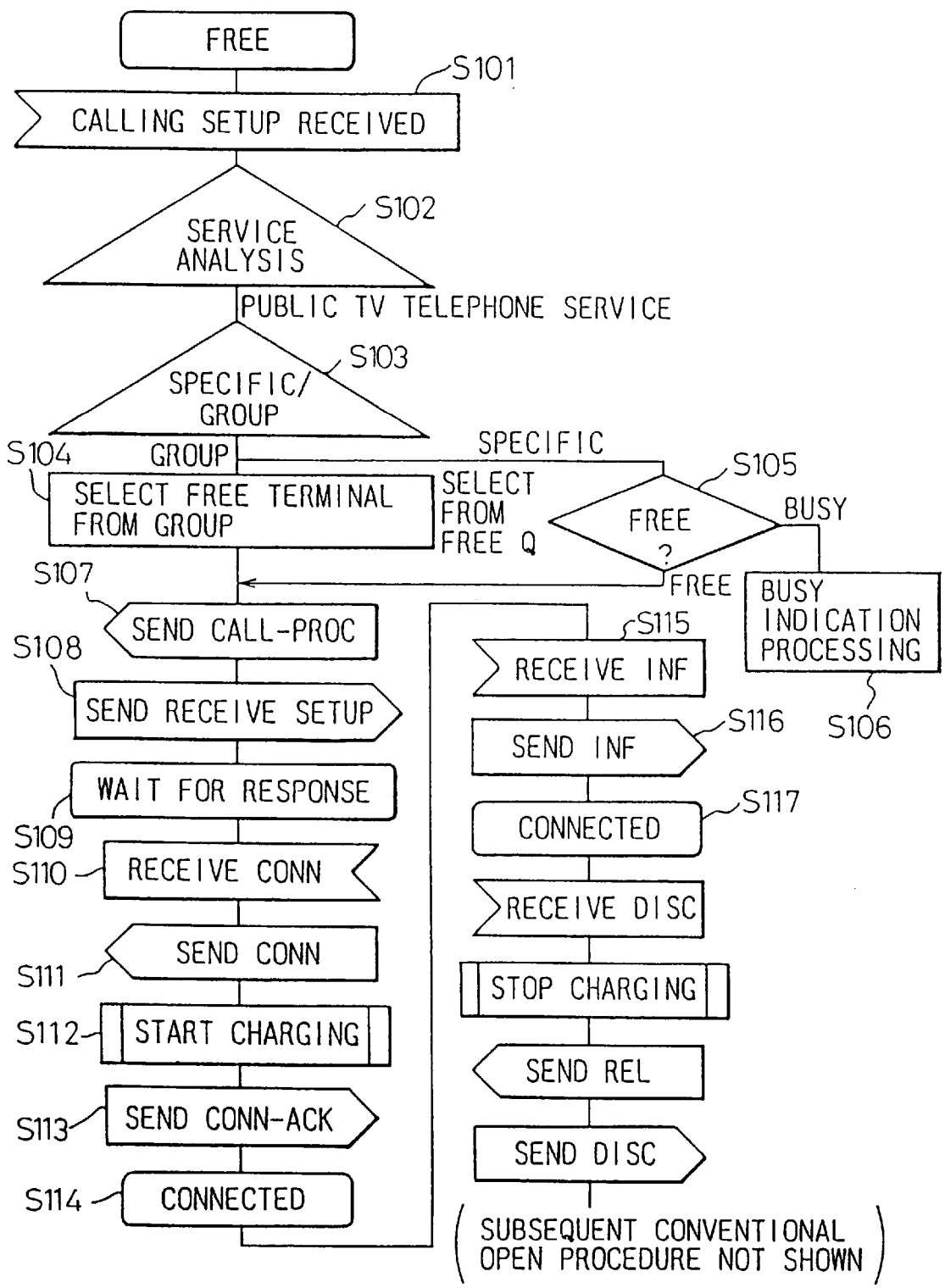
FIG. 10 is a flowchart which shows an example of the flow of control in the exchange.
Figure 11:
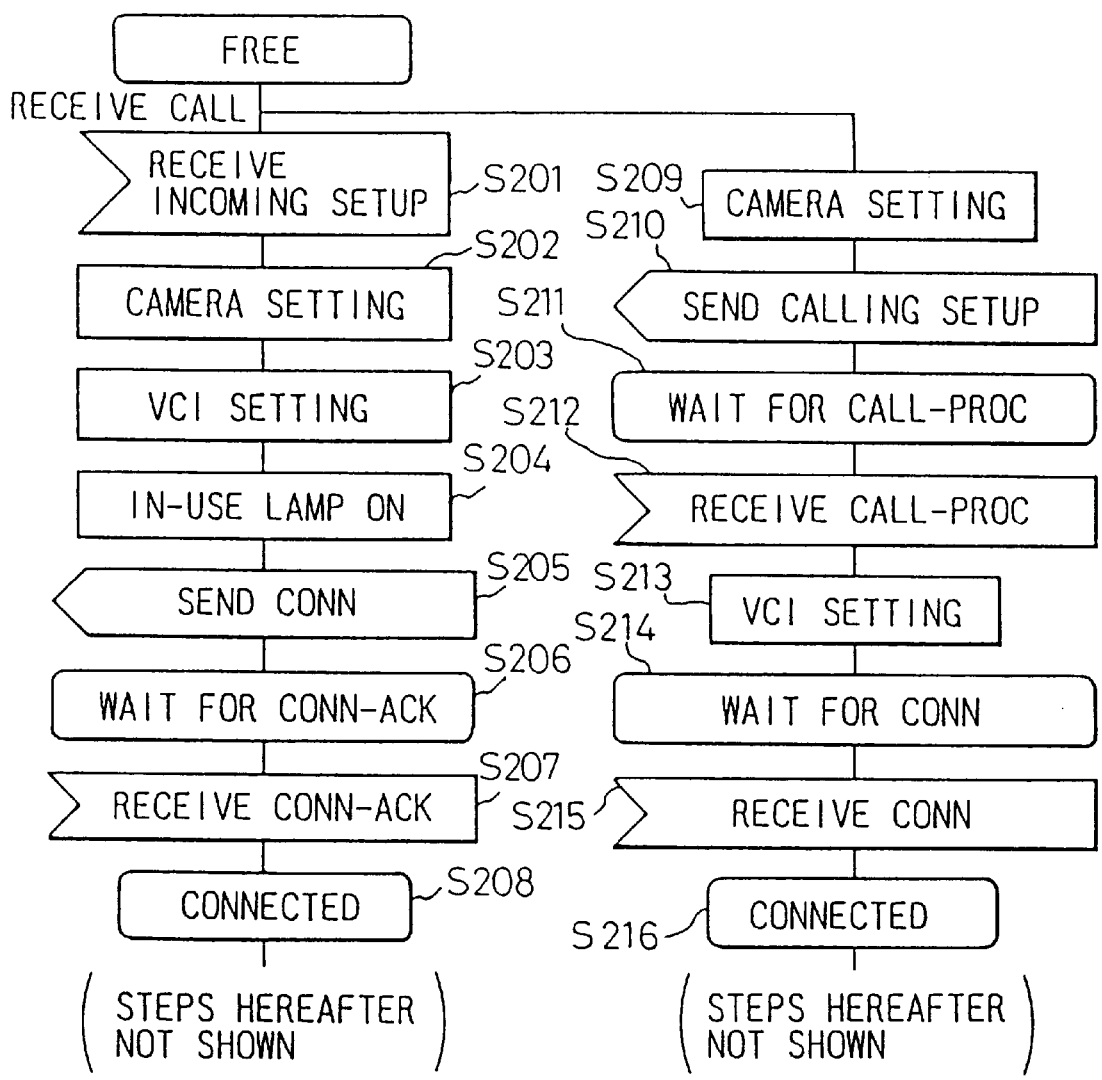
FIG. 11 is a flowchart which shows an example of the flow of control at the public TV telephone terminal.

FIG. 10 and FIG. 11 are flowcharts which show examples of, respectively, the control flow of the exchange related to FIG. 9, and the control flow at the public TV telephone terminal.

FIG. 9 shows the basic message sequence for the embodiment of the present invention, with <1> being the calling sequence from the user to the exchange , <2> being the calling sequence from the exchange to the public TV telephone terminal, <3> being the path connection sequence at the exchange, and <4> being the camera control sequence between the user terminal and the public TV telephone terminal during operation.

What follows is a detailed explanation of the above sequences, making reference to FIG. 10 and FIG. 11.

In FIG. 10, when the exchange receives a SETUP message in the free state, a service analysis is performed of this message (S101, S102). Then, if this is interpreted as a public terminal use service, a determination is made as to whether this is a service for a specific public TV telephone terminal or service with respect to a group (S103). In the case of service for a specific public TV telephone terminal, whether it is free is determined, and if it is busy processing is performed to notify of the busy condition (S105, S106). If the free condition is verified (S105) or if it is a group service and a free terminal of the group is selected (S104), the CALL-PRC message which indicates that the other terminal is being called is sent to the user terminal (S107).

Next, the receiving SETUP message is sent to the public TV telephone terminal, and a response is awaited (S108, S109). When the CONN message is received from the public TV telephone terminal, a path is set between the user terminal and the public TV telephone terminal, this placing the two in communication (S110 to S114). When this is done, the billing of the calling terminal is begun (S112). During the connection, INF messages as described above for the purpose of camera control are received from the user terminal, these being transparently transferred to the public TV telephone terminal (S115, S116). Thereafter, the flow is the general type of open-path processing flow, which will not be explained herein.

Next, the control flow at the public TV telephone terminal will be explained, making reference to FIG. 11. When the receiving SETUP message is received from the exchange in the free condition (S201), a switch is made to the movable camera, which includes a microphone, the VCI image/sound transmission is set, and the in-use lamp is turned on (S202 to S204). Next, the above-described CONN message is sent to the exchange and the connected condition is enabled (S205 to S208). Steps S209 to S216 in FIG. 11 are the flow in the case in which a call is received from a public TV telephone terminal, with the flow after switching to the fixed camera when the call is made (S209) being the same as the normal procedure, this not being explained herein.

As described above, according to the present invention it is possible to use the camera, microphone and other elements of a TV telephone terminal, the future adoption of which is inevitable, to enable a general user of a TV telephone to, for example, from the home, call such public TV telephone terminals installed in such locations as tourist spots, the mountains, and the seashore, the terminal then providing the user with live images and natural sounds. In addition, in doing this, it is possible to freely set the angle and focus of the camera as desired, thereby greatly broadening the ability to select the desired image and solving the problem in the past of tiring of the images provided.

In addition, according to the present invention, because a public TV telephone terminal is used, it is not necessary to have costly facilities such as an image database to provide image information, environmental images and natural sounds being easily available at low cost.

What is claimed is:

1. A TV telephone apparatus for sending and receiving images and sound, comprising:

a public telephone including a telephone terminal;

a fixed camera and a headset connected with said telephone terminal for sending images from said fixed camera and sound from said headset;

a movable camera installed at said public telephone for obtaining images of surrounding areas;

a sound collection microphone associated with said movable camera for collecting surrounding sound;

automatic answering means for receiving a call from a calling terminal that requests transmission of said images of surrounding areas and said surrounding sound; and transmission switching means for connecting selectively one of (a) said fixed camera and headset if there is an answer by a user to said call and (b) if there is no answer by a user to said call, connecting said movable camera and sound collection microphone for transmission of signals from said TV telephone apparatus, if there is no answer by a user to said call said transmission switching means automatically switching a connection from said fixed camera and headset and connecting said movable camera and said sound collection microphone before a communication path is connected between said TV telephone apparatus and said calling terminal in response to instructions initiated when said automatic answering means receives said call from said calling terminal.

2. A TV telephone apparatus according to claim 1, further comprising display means for indicating that said automatic answering means has been started.

3. A TV telephone apparatus according to claim 2 wherein said display means is an in-use lamp.

4. A TV telephone apparatus according to claim 1, wherein said automatic answering means includes a CPU, a ROM and a RAM.

5. A TV telephone apparatus according to claim 1, wherein said transmission switching means includes both an image signal switching circuit which selects one of said fixed camera and movable camera and a voice signal switching circuit for selecting one of said headset and sound collection microphone.

6. A TV telephone apparatus according to claim 5, which further includes a separation/multiplexing circuit coupled to both said image signal switching circuit and said voice signal switching circuit for separating incoming ATM cells into image cells, voice cells and signal cells.

7. A TV telephone apparatus according to claim 6, which further includes an image transmitting/receiving circuit coupled between said separation/multiplexing circuit and said image signal switching circuit for both converting said image cells received from said separation/multiplexing circuit into an analog video signal and converting an analog video signal received from one of said fixed camera and movable camera into image cells.

8. A TV telephone apparatus according to claim 6, which further includes a sound transmission/reception circuit coupled between said separation multiplexing circuit and said voice signal switching circuit for both converting said voice cells received from said separation/multiplexing circuit into analog audio signals and converting analog audio signals received from one of said headset and microphone into voice cells.

9. A TV telephone apparatus according to claim 6, which further includes a signal circuit coupled between said separation/multiplexing circuit and said automatic answering means for executing layer and layer control of said signal cells.

10. A TV telephone apparatus as in claim 1, further comprising:

movable camera remote control means for performing remote control of said movable camera, in accordance with prescribed control signals sent from said calling terminal.

11. A TV telephone apparatus for sending and receiving at least images, comprising:

a public telephone including a telephone terminal;

a fixed camera connected with said telephone terminal for sending images from said fixed camera;

a movable camera installed at said public telephone for obtaining images of surrounding areas;

automatic answering means for receiving a call from a calling terminal that requests transmission of said images of surrounding areas; and transmission switching means for connecting selectively one of (a) said fixed camera if there is an answer by a user to said call and (b) if there is no answer by a user to said call, connecting said movable camera for transmission of signals from said TV telephone apparatus, if there is no answer by a user to said call said transmission switching means switching a connection from said fixed camera and connecting said movable camera before a communication path is connected between said TV telephone apparatus and said calling terminal, in response to instructions initiated when said automatic answering means receives said call requesting transmission of images of surrounding areas from said calling terminal.

12. A TV telephone apparatus according to claim 11, where said automatic answering means includes a CPU, a ROM and RAM.

13. A TV telephone apparatus according to claim 11, which further means includes a selection/multiplexing circuit coupled to said transmission switching means for separating incoming ATM cells into image cells, voice cells and signal cells.

14. A TV telephone apparatus according to claim 13, which further includes an image transmitting/receiving circuit coupled between said separation/multiplexing circuit and said transmission switching means for both converting said image cells received from said separation/multiplexing circuit into an analog video signal and converting an analog video signal received from one of said fixed camera and movable camera into image cells.

15. A TV telephone apparatus according to claim 13, which further includes a signal circuit coupled between said separation/multiplexing circuit and said automatic answering means for executing layer and layer control of said signal cells.

16. A TV telephone apparatus for sending and receiving images and sound, comprising:

a public telephone including a telephone terminal;

a fixed camera for producing image signals and a headset for producing audio signals;

a movable camera installed at said public telephone for producing image signals of the surrounding area;

a microphone associated with said movable camera for producing audio signals of the surrounding area;

transmission switching means for normally transmitting said image and audio signals produced by said fixed camera and headset when an incoming call is answered by a user, and capable of being switched on instruction for transmitting said image and audio signals of surrounding area when said incoming call is not answered by a user;

automatic answering means for automatically answering said incoming call that has not been answered by a user and before said telephone apparatus is connected to a calling terminal of said incoming call providing said instruction automatically to switch said transmission switching means to transmit said image and audio signals of surrounding area; and a signal circuit coupled to said automatic answering means for executing layer and layer control on incoming signal cells.

17. A method of controlling a public TV telephone apparatus having a movable camera and a movable microphone that can be remote-controlled by a calling side, comprising the steps of:

receiving an incoming call at said apparatus:

if there is no answer by a user, automatically answering the incoming call;

when automatically answering the incoming call, at once activating the movable camera and movable microphone;

connecting a communication path from said apparatus to said calling side; and transmitting moving image and audio signals of a surrounding area through the movable camera and movable microphone under remote-control of said calling side via said communication path.

* * * * *